United States Patent [19]
Schneider

[11] Patent Number: 6,082,943
[45] Date of Patent: Jul. 4, 2000

[54] SELF-CLAMPING FASTENING RING

[75] Inventor: Kurt Schneider, Welzheim, Germany

[73] Assignee: Christian Bauer GmbH & Co., Welzheim, Germany

[21] Appl. No.: 09/171,328

[22] PCT Filed: Apr. 4, 1997

[86] PCT No.: PCT/DE97/00705

§ 371 Date: Oct. 15, 1998

§ 102(e) Date: Oct. 15, 1998

[87] PCT Pub. No.: WO97/39249

PCT Pub. Date: Oct. 23, 1997

[30] Foreign Application Priority Data

Apr. 17, 1996 [DE] Germany .......................... 196 15 130

[51] Int. Cl.[7] .................................................. F16B 21/18
[52] U.S. Cl. .......................... 411/517; 411/353; 411/519; 411/526
[58] Field of Search ................................... 411/352, 353, 411/517, 519, 525, 526, 527

[56] References Cited

U.S. PATENT DOCUMENTS

| | | | |
|---|---|---|---|
| 2,798,748 | 7/1957 | Maurer | 411/519 X |
| 3,180,388 | 4/1965 | Newcomer, Jr. et al. | 411/353 |
| 4,818,166 | 4/1989 | Szukay et al. | |
| 5,833,422 | 11/1998 | Haga et al. | 411/526 |

FOREIGN PATENT DOCUMENTS

| | | | |
|---|---|---|---|
| 1071376 | 8/1954 | France | 411/519 |
| 635 553 | 3/1937 | Germany . | |
| 1 922 373 | 6/1965 | Germany . | |
| 23 00 064A | 7/1974 | Germany . | |
| 25 54555C2 | 4/1977 | Germany . | |
| 339455 | 12/1930 | United Kingdom | 411/519 |
| WO86/07419 | 6/1986 | WIPO . | |

*Primary Examiner*—Neill Wilson
*Attorney, Agent, or Firm*—Collard & Roe, PC

[57] ABSTRACT

An elastic fastening ring that can be mounted in a self-clamping manner on a bearing part should have a simple design, a reliable operation and at the same time the function of an axial spring element. For this purpose, the disclosed fastening ring consists of a washer with a sinuous ring-shaped band whose length may be elastically changed in the circumferential direction over its whole radial width.

5 Claims, 2 Drawing Sheets

SELF-CLAMPING FASTENING RING

BACKGROUND OF THE INVENTION

1. Field of the Invention

Use of a meandering washer as a fastening ring.

The invention relates to the use of a meandering washer as a fastening ring having the features of claim 6.

A washer having the subject-matter features of claim 6 is already know, for use as a cup spring, from U.S. Pat. No. 4,680,847.

2. Description of the Relaed Art Including Information Disclosed Under 37 C.F.R. 1.97 and 1.98.

Comparable meandering rings in the form of split rings, which can each be introduced into an annular groove of a carrier part radially on the inside or outside, with stressing, are known as fasterning rings. By virtue of being embedded in a groove, these fastening rings can transmit axial forces and thus serve as a fastening element for absorbing axial forces. If the intention is to use such a fastening ring to retain a fastenable part in a precisely defined manner in the axial direction on a carrier part, in the form for example of a shaft or of a pipe socket, this requires very precise production at one end of the fastenable part in the axial direction between the axial fastening surfaces of said part and the position of the receiving groove, which is to be provided in the carrier part, for the split fastening ring. Even with extremely precise production, in practice, axially play-free fastening cannot usually be achieved in a sufficiently reliable manner. Furthermore, it is not possible, using such fastening rings, for a fastenable part to be clamped in with axially acting spring force. In order to achieve a clamping-in action under spring force in the axial direction, it is necessary, in the case of such fastening rings, for a spring element to be introduced between the fastening ring and the fastenable part. Such a spring element may be, for example, a cup spring.

Furthermore, closed washers which are serrated over the inner circumference are also known as fastening rings. These washers may be designed as cup springs. Such a washer which is closed over its circumference radially on the outside does not ensure sufficiently reliable self-clamping for a non-slip fastening position with high axial forces acting on the washer. Moreover, such a washer which is split just on its inner circumference does not permit axial spring stressing forces.

As a fastening element for, for example, a releasable axial connection of two shafts, use is made, in the prior art, of washers which each comprise a meandering annular band, which, closed in the circumferential direction, can be changed in length elastically over its entire radial width. However, these washers are not used as self-clamping fastening rings. Those washers only become a fastening element by being introduced in an approximately positively locking manner into an annular gap, formed by the two parts which are to be connected to one another, in twisted form radially on the inside and outside, and then by being braced axially. Twisted form in this case means that the annular band extends in a surface generated by a cone.

By virtue of the annular band being forced in the direction of a planar progression during axial bracing, the internal diameter decreases with a simultaneous increase in the external diameter. These changes in diameter result in radial bracing between one part, designed as an externally abutting bushing, and the other part, which as a shaft engages internally, it being the intention for these parts to be connected to one another. In such a case, the bracing, which is to be applied axially, takes place, for example, via an adjusting nut acting on one of the two parts which are to be connected.

BRIEF SUMMARY OF THE INVENTION

Taking this as departure point, the invention deals with the problem of providing a fastening ring which is of straightforward construction and provides a reliable grip without additional parts.

A solution for this problem is given by the use of a washer as a fastening ring in accordance with the features of claim 1.

The invention is based on the idea of a washer which is elastically expansible in the circumferential direction being pushed, with prestressing, onto or into a carrier part, which may be for example a shaft or a pipe socket.

In the case of a pushing-on operation, the internal diameter is increased in each case, this resulting in the annular band lengthening over its entire radial width. This thus produces, within the annular band, circumferential stressing, which results in the annular band twisting conically. The twisting effect is brought about in that the radially outer annular-band regions try to assume a position which is as close as possible to their initial energy state, that is to say the annular band tries to assume a position with the smallest possible change in energy with respect to the initial position. The twisting effect, and thus the conical oblique positioning of the annular band, increases as radial widening of the annular band increases.

The oblique positioning of the annular band, which is brought about by the twisting, thus has its origins in the resiliently acting circumferential force which is produced in the circumference of the annular band by the latter being widened. This means, in turn, that it is possible to change the oblique positioning of the annular band by the axial application of force, a spring force which emanates axially from the annular band being produced in the process. In this case, the spring force emanates from the circumferential force from the elastic deformation of the annular band. It is thus possible to set the spring force by the increase in diameter when the washer is pushed onto a carrier part. This means that, depending on radial prestressing, it is possible to use the same fastening ring according to the invention to realize springs which act differently in the axial direction. The same goes analogously for a fastening ring according to the invention which is clamped in a sleeve.

The fastening ring according to the invention thus provides a fastening means which, with secure axial fixing on a carrier part, simultaneously acts as an axial spring with a spring force which can be preset. As a result, fastenable parts can be braced axially by such a ring. This constitutes a considerable advantage since, for this purpose, there is no need for any additional part, as in the case of the split fastening rings, the so-called spring rings, of the prior art described in the introduction.

In the case of the fastening rings according to the invention, it is expedient for these to be designed with an oblique, conically running annular band even in the initial state. This reliably defines in advance, in a straightforward manner, in which direction twisting of the annular band will take place in the event of lengthening or shortening.

With regard to twisting, washers have a so-called centre point of inversion within the radial cross-section of the annular band, the circumferential stressing emanating from said centre point as a radially acting force. In practice, the centre point of inversion S is thus the centre point of force which is critical for the radial stressing which emanates from the annular element. If this centre point of force is located outside the radial abutment surface of the annular band against an associated carrier part, there is a moment which gives the washer an axially acting spring force.

A washer which runs conically in the stressed state may be deformed with the axial application of force, into a planar state counter to an axial spring force produced by the annular band. If, in such a planar state, the annular band butts, radially on the outside or inside, in full surface contact against a carrier part over its entire height, then the centre point of inversion is likewise located in the region of the annular-band plane, to be precise approximately halfway up the axial height of the resilient band. As a result, there can be no spring moment in such a position, that is to say in such a position the washer does not have any axial spring force. In order to avoid this, the radially inner or outer abutment surface of the annular band is to be configured such that there is an active spring moment in each case within a predeterminable twisting range, including a planar extent of the annular band. This can be achieved in that the radial abutment surfaces achieve corresponding oblique positioning with respect to the radial extent of the annular band. Such a configuration of the radial annularband circumferential surfaces also makes it possible to achieve, in particular, a kind of linear contact with respect to the carrier part on which the washer is braced. Such linear contact increases the resistance against displacement of the washer in the axial direction, this advantageously improving the functional reliability of the fastening ring.

The fastening ring according to the invention provides, overall, a straightforward fastening element which can be fixed securely in the axial direction and additionally has the great advantage of simultaneously constituting an axially acting spring with a spring force which can be set depending on the radial prestressing in each case. This spring action makes it possible, even if the fastenable part has not been produced particularly precisely in the axial direction, to have axially play-free fixing, in practice, with the axial spring force being utilized in the process. In a fair number of cases, axially resilient mounting is even desired or, in part, also necessary. This applies, for example, when a fastenable part changes in its axial length by heat expansion at varying temperatures. In such cases, it is also desirable to have resilient follow-up stressing, in which a fastenable part is forced against a seal, with stressing, by the fastening ring and the material of this seal, over the course of time, undergoes plastic deformation in the direction of axial shortening.

BRIEF DESCRIPTION OF SEVERAL VIEWS OF THE DRAWINGS

An exemplary embodiment is illustrated in the drawing, in which.

DETAILED DESCRIPTION OF THE INVENTION

A fastening ring 1 comprises a meandering annular band 2 which can be deformed elastically in the circumferential direction. The material of the annular band 2 is, for example, a spring steel.

Figure 1:
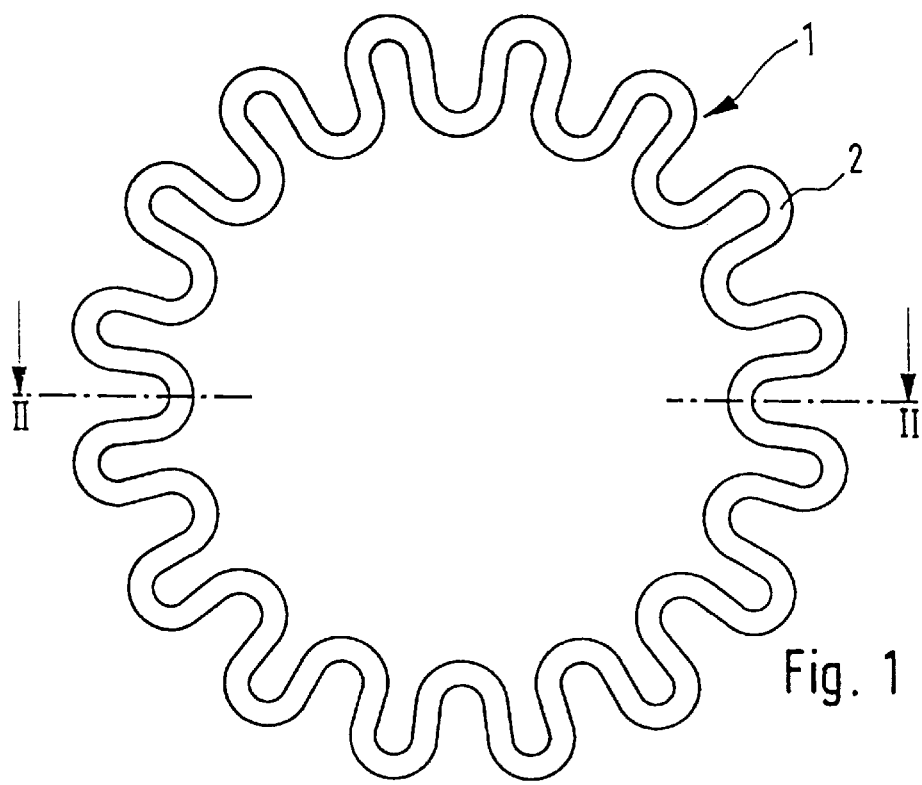
FIG. 1 shows a plan view of an elastic fastening ring with a meandering annular band.
Figure 2:
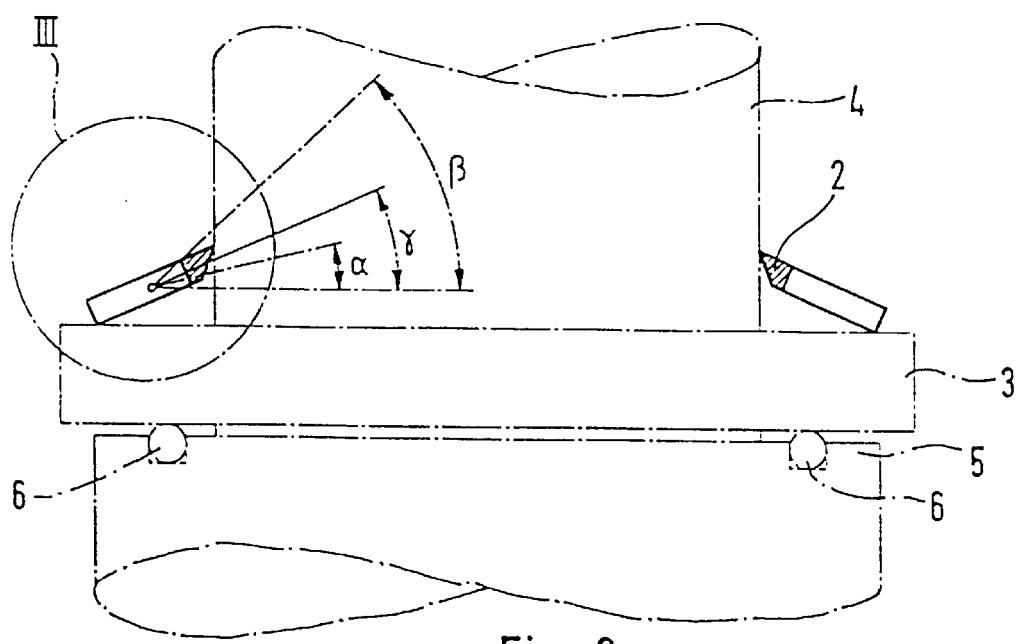
FIG. 2 shows a section through the fastening ring along line II—II in FIG. 1, with abutment against a cylindrical carrier part being indicated.

In the non-stressed, initial position of the fastening ring 1, the annular band 2 is oriented conically. This cone angle is indicated in FIG. 2 by a. This angle may be of a magnitude of, for example, between 0 and 45.

In order for it to be possible for a fastening part 3, which may be for example a plate, to be fixed in an axially play-free manner, with spring stressing, on a carrier part 4, which may be for example a spindle with an annular collar 5, the fastening ring 1 is drawn onto the cylindrical part of the carrier part 4 with expansion in the circumferential direction. During this drawing-on operation of the fastening ring 1, the annular band 2 twists in the direction of a relatively pronounced oblique position, which is indicated in FIG. 2 by the angle b, and constitutes the cone angle in the installed state, and is thus greater than the initial angle a. Thereafter, the fastening ring 1 is forced against the fastening part 3 with the application of axial force, in which case the annular band 2 is twisted back, in the direction of a pronounced axial spring action, to a cone angle g, which, in magnitude, is between the initial angle a and the cone angle b of the fastening ring 1 which is only expanded but is not loaded in the axial direction.

The difference between angles b and g gives the prestressed spring compensating excursion in the axial direction, via which axial follow-up stressing is possible if an elastic seal 6 provided in the annular collar 5 should, over the course of time, shorten axially under plastic deformation.

Figure 3A:
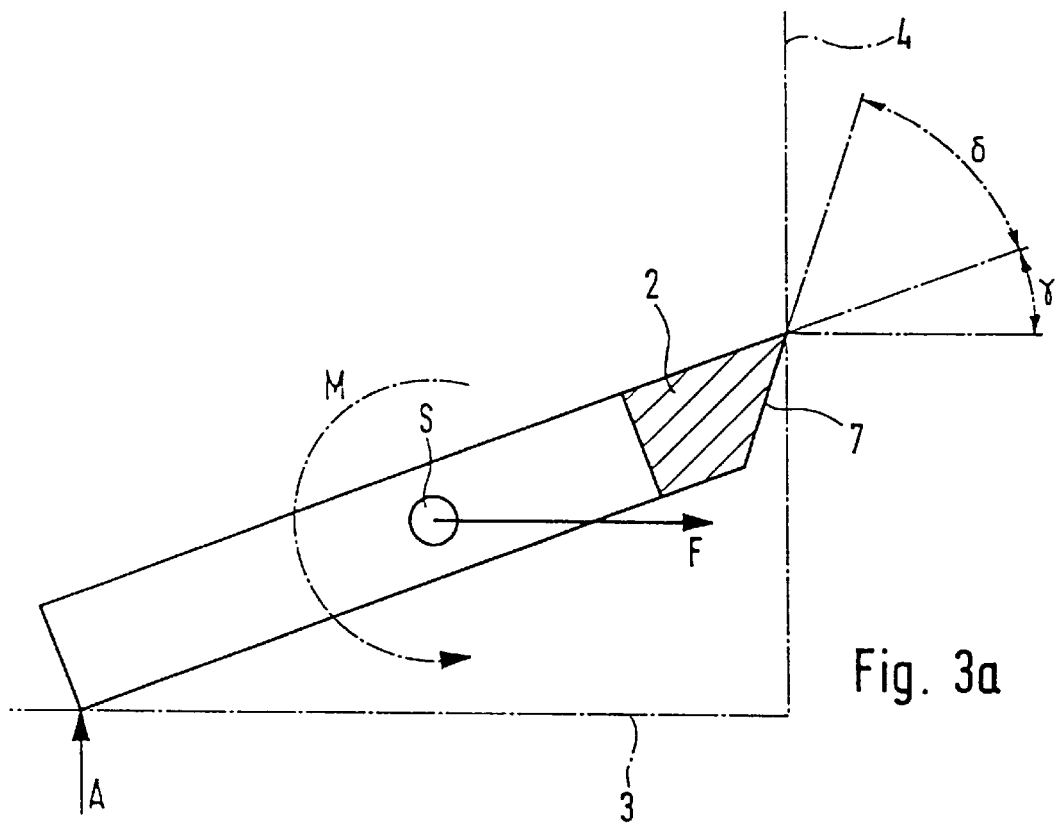
FIG. 3a shows a detail in accordance with the circle III in FIG. 2 with forces depicted.

FIG. 3a illustrates, in a section through a web of an annular band 2, said annular band 2 butting against a carrier part 4 in a radially expanded manner. S indicates the position of the centre point of inversion of this annular-band cross-section. In practice, this is the centre point of force of the annular-band cross-section through which the circumferential stressing force runs. A radial force component F emanates from this point. A moment M acts in terms of the abutment of the annular band 2 against the carrier part 4. This moment M counteracts an axial abutment force A, emanating from the annular band 5, as spring force.

Figure 3B:
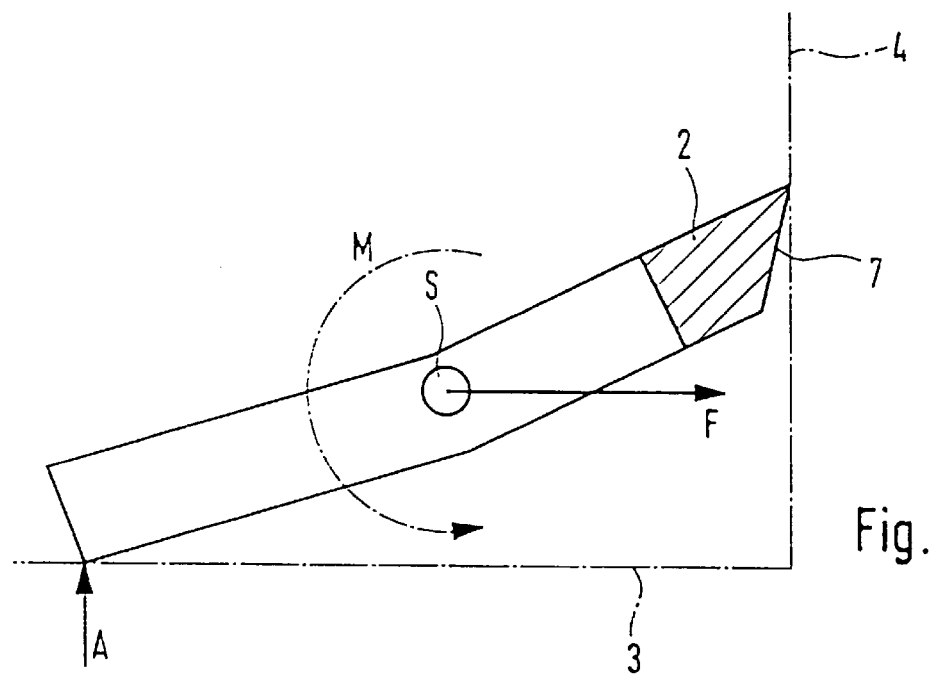
FIG. 3b shows the detail according to FIG. 3a with an "angled" annular-band cross-section.

An increased spring moment M can be achieved by a "bent" annular-band shape, as is depicted in FIG. 3b, since in this case, with the same overall radial and axial extent of the fastening ring 1, the centre point of inversion "S" is at an increased axial distance away from the radially inner abutment surface against the carrier part 4. This results in turn, in the axial direction, in an increased lever arm for producing the spring moment M. The radial spacing of the centre point of inversion "S" remains virtually unchanged in the bent form, as does thus also the lever arm which acts in this direction in relation to a moment.

The radially inner abutment surface 7 of the annular band 2 is designed at an acute angle d with respect to the plane of the annular band 2. This maintains a resiliently acting moment M even in the case of a planar orientation of the annular band 2, parallel to the abutment surface of the annular collar 5. Furthermore, such an angled abutment surface 7 ensures linear abutment of the annular band 2 against the carrier part 4.

A fastening ring according to the invention can thus achieve the following particularly prominent advantages and effects.

The application of an axial force A on the outer circumference of a fastening ring 1 drawn, with expansion, onto a spindle, as carrier part, decreases the twisted position (conicity) of the annular band 2 of the stressed fastening ring 1. This results, in turn, in radial widening of the circle of the centre points of inversion of the annular band 2, i.e. the centre points of inversion S of the annular-band cross-sections move radially outwards. This causes an increased radial force of the fastening ring 1, by means of which the latter butts against a spindle, as carrier part 4.

A force A acting in the axial direction on the external diameter of a fastening ring 1 which has been drawn onto a spindle, as carrier part 4, produces over approximately the width of the annular band 2, as a lever arm, a moment in the right-hand direction. A moment in the left-hand direction, in contrast, is produced in the annular band 2 by an abutment reaction force passing from the carrier part 4 to the annular band 2. Disregarding the intrinsic angular momentum of the web cross-sections of the annular band, the two moments are in equilibrium.

The radial stiffness of the fastening ring 1 can be predetermined by suitable dimensioning of the meandering annular band 2.

A specific selection of the radially inner abutment region of the annular band 2 against the carrier part 4 makes it possible to predetermine the length of the lever arm running parallel to the axis of the fastening ring 1 (distance between the radial abutment region and centre point of inversion of the annular band 2).

The length of the lever arm running parallel to the axis of the fastening ring 1 can also be influenced by specific shaping of the annular-band cross-section (for example radial bending).

In the case of a fastening ring 1 drawn onto a carrier part 4, the three last-mentioned measures can influence within wide limits, in a given installation situation, the force acting on the external diameter in the direction of the axis of the fastening ring 1. These three measures make it possible, with axial displacement of the external diameter, for a large number of different spring characteristics to be realized for the axial spring action of the fastening ring 1.

Although the drawing depicts just one embodiment, in which the fastening ring 1 has been clamped onto a cylindrical part, this fastening ring 1 may also be clamped into a sleeve with the same effect. All that is required in this case is for the relationships "radially inside and outside" to be changed round.

What is claimed is:

1. Use of a washer made of a meandering annular band, which is closed in the circumferential direction and can be changed in length in this circumferential direction over its entire radial width, as a fastening ring which butts against a carrier part with radial, and axial self-clamping wherein when said band is installed, at least one oL its circumferential surfaces, and at least one of its faces are in each case unsupported.

2. Use of a washer according to claim 1, in the case of which, in the non-stresses state, the annular band of the washer runs conically.

3. Use of a washer according to claim 1, in the case of which the respective abutment surface of the annular band, said abutment surface coming to be located against a carrier part with radial stressing, is angled with respect to the annular-band plane such that the abutment against the carrier part always takes place, within a twisting range which can be predetermined for the annular band, outside a plane defined by the circle of the center points of inversion of the annular band.

4. Use of a washer according to claim 1, in the case of which, in a predeterminable twisting range, the annular band butts against a carrier part essentially linearly.

5. Use of a washer according to claim 1, in the case of which the washer-like cross-section of the annular band, located in the radial planes of the fastening ring, is bent, with the effect of an axial increase in the distance between the crosssectional center point of inversion and the abutment provided radially against a carrier part.

* * * * *

UNITED STATES PATENT AND TRADEMARK OFFICE
CERTIFICATE OF CORRECTION

PATENT NO. : 6,082,943
DATED : July 4, 2000
INVENTOR(S) : Kurt SCHNEIDER

It is certified that error appears in the above-identified patent and that said Letters Patent is hereby corrected as shown below:

In column 6, line 11 (line 6 of claim 1), change "oL" to --of--.

Signed and Sealed this

Seventeenth Day of April, 2001

Attest:

NICHOLAS P. GODICI

*Attesting Officer*  *Acting Director of the United States Patent and Trademark Office*